(12) United States Patent
Meyerzon et al.

(10) Patent No.: US 7,739,277 B2
(45) Date of Patent: Jun. 15, 2010

(54) SYSTEM AND METHOD FOR INCORPORATING ANCHOR TEXT INTO RANKING SEARCH RESULTS

(75) Inventors: Dmitriy Meyerzon, Bellevue, WA (US); Stephen Edward Robertson, London (GB); Hugo Zaragoza, Cambridge (GB); Michael J. Taylor, Cambridge (GB)

(73) Assignee: Microsoft Corporation, Redmond, WA (US)

(*) Notice: Subject to any disclaimer, the term of this patent is extended or adjusted under 35 U.S.C. 154(b) by 217 days.

(21) Appl. No.: 10/955,462

(22) Filed: Sep. 30, 2004

(65) Prior Publication Data

US 2006/0074871 A1 Apr. 6, 2006

(51) Int. Cl.
*G06F 17/30* (2006.01)
(52) U.S. Cl. .................................. 707/726; 707/727
(58) Field of Classification Search ................ 715/500; 704/9, 231, 10; 709/224; 707/1, 204, 9
See application file for complete search history.

(56) References Cited

U.S. PATENT DOCUMENTS

| | | | | |
|---|---|---|---|---|
| 5,222,236 A | | 6/1993 | Potash et al. ............... 707/102 |
| 5,257,577 A | * | 11/1993 | Clark ........................... 100/99 |
| 5,594,660 A | | 1/1997 | Sung et al. ............... 715/500.1 |
| 5,606,609 A | | 2/1997 | Houser et al. ............... 713/179 |
| 5,848,404 A | | 12/1998 | Hafner et al. .................. 707/3 |
| 5,893,092 A | | 4/1999 | Driscoll ......................... 707/5 |
| 5,920,859 A | * | 7/1999 | Li ................................... 707/5 |
| 5,933,851 A | | 8/1999 | Kojima et al. ............... 711/133 |
| 5,960,383 A | | 9/1999 | Fleischer ....................... 704/9 |
| 5,983,216 A | | 11/1999 | Kirsch et al. .................. 707/9 |
| 5,987,457 A | | 11/1999 | Ballard ........................... 707/5 |
| 6,006,225 A | | 12/1999 | Bowman et al. ............... 707/5 |
| 6,012,053 A | | 1/2000 | Pant et al. ....................... 707/3 |
| 6,032,196 A | | 2/2000 | Monier ....................... 709/245 |
| 6,041,323 A | | 3/2000 | Kubota ........................... 707/5 |

(Continued)

FOREIGN PATENT DOCUMENTS

DE 100 29 644 A1 1/2002

(Continued)

OTHER PUBLICATIONS

Jones, K. et al, "A probabiistic model of information retrieval: development and status", Department of Information Science, City University, London, Aug. 1998, 74 pgs.*

(Continued)

*Primary Examiner*—Apu M Mofiz
*Assistant Examiner*—Hung D Le
(74) *Attorney, Agent, or Firm*—Merchant & Gould P.C.

(57) ABSTRACT

Search results of a search query on a network are ranked according to a scoring function that incorporates anchor text as a term. The scoring function is adjusted so that a target document of anchor text reflect the use of terms in the anchor text in the target document's ranking. Initially, the properties associated with the anchor text are collected during a crawl of the network. A separate index is generated that includes an inverted list of the documents and the terms in the anchor text. The index is then consulted in response to a query to calculate a document's score. The score is then used to rank the documents and produce the query results.

18 Claims, 6 Drawing Sheets

U.S. PATENT DOCUMENTS

| | | | |
|---|---|---|---|
| 6,070,158 A | 5/2000 | Kirsch et al. | 707/3 |
| 6,070,191 A | 5/2000 | Narendran et al. | 709/226 |
| 6,098,064 A | 8/2000 | Pirolli et al. | 707/2 |
| 6,125,361 A * | 9/2000 | Chakrabarti et al. | 707/3 |
| 6,128,701 A | 10/2000 | Malcolm et al. | 711/133 |
| 6,145,003 A | 11/2000 | Sanu et al. | 709/225 |
| 6,151,624 A | 11/2000 | Teare et al. | 709/217 |
| 6,167,369 A | 12/2000 | Schulze | 704/9 |
| 6,182,085 B1 | 1/2001 | Eichstaedt et al. | 707/104.1 |
| 6,182,113 B1 | 1/2001 | Narayanaswami | 709/203 |
| 6,185,558 B1 | 2/2001 | Bowman et al. | 707/5 |
| 6,202,058 B1 | 3/2001 | Rose et al. | 706/45 |
| 6,208,988 B1 | 3/2001 | Schultz | 707/5 |
| 6,216,123 B1 | 4/2001 | Robertson et al. | 707/3 |
| 6,222,559 B1 | 4/2001 | Asano et al. | 345/440 |
| 6,240,407 B1 | 5/2001 | Chang et al. | 707/2 |
| 6,240,408 B1 | 5/2001 | Kaufman | 707/3 |
| 6,247,013 B1 | 6/2001 | Morimoto | 707/10 |
| 6,263,364 B1 | 7/2001 | Najork et al. | 709/217 |
| 6,285,367 B1 | 9/2001 | Abrams et al. | 345/357 |
| 6,285,999 B1 * | 9/2001 | Page | 707/5 |
| 6,304,864 B1 | 10/2001 | Liddy et al. | 706/15 |
| 6,317,741 B1 | 11/2001 | Burrows | 707/5 |
| 6,327,590 B1 | 12/2001 | Chidlovskii | 707/5 |
| 6,349,308 B1 | 2/2002 | Whang et al. | 707/107 |
| 6,351,467 B1 | 2/2002 | Dillon | 370/432 |
| 6,351,755 B1 | 2/2002 | Najork et al. | 707/501.1 |
| 6,360,215 B1 | 3/2002 | Judd et al. | 707/3 |
| 6,385,602 B1 | 5/2002 | Tso et al. | 707/3 |
| 6,389,436 B1 | 5/2002 | Chakrabarti et al. | 715/513 |
| 6,418,433 B1 | 7/2002 | Chakrabarti et al. | 707/5 |
| 6,418,452 B1 | 7/2002 | Kraft et al. | 707/200 |
| 6,418,453 B1 | 7/2002 | Kraft et al. | 707/200 |
| 6,442,606 B1 | 8/2002 | Subbaroyan et al. | 709/224 |
| 6,473,752 B1 | 10/2002 | Fleming | 707/4 |
| 6,484,204 B1 | 11/2002 | Rabinovich | 709/226 |
| 6,516,312 B1 | 2/2003 | Kraft et al. | 707/3 |
| 6,539,376 B1 | 3/2003 | Sundaresan et al. | 707/5 |
| 6,546,388 B1 | 4/2003 | Edlund et al. | 707/5 |
| 6,547,829 B1 | 4/2003 | Meyerzon et al. | 715/501.1 |
| 6,549,896 B1 | 4/2003 | Candan et al. | 707/2 |
| 6,549,897 B1 | 4/2003 | Katariya et al. | 707/5 |
| 6,594,682 B2 | 7/2003 | Peterson et al. | 718/102 |
| 6,598,047 B1 | 7/2003 | Russell et al. | 707/5 |
| 6,598,051 B1 | 7/2003 | Wiener et al. | 7/100 |
| 6,601,075 B1 | 7/2003 | Huang et al. | 707/104.1 |
| 6,622,140 B1 * | 9/2003 | Kantrowitz | 707/5 |
| 6,628,304 B2 | 9/2003 | Mitchell et al. | 345/734 |
| 6,633,867 B1 | 10/2003 | Kraft et al. | 707/3 |
| 6,633,868 B1 | 10/2003 | Min | 707/3 |
| 6,636,853 B1 | 10/2003 | Stephens | 707/10 |
| 6,638,314 B1 | 10/2003 | Meyerzon et al. | 715/234 |
| 6,671,683 B2 | 12/2003 | Kanno | 707/5 |
| 6,701,318 B2 | 3/2004 | Fox et al. | 707/10 |
| 6,718,324 B2 | 4/2004 | Edlund et al. | 707/5 |
| 6,718,365 B1 | 4/2004 | Dutta | 709/203 |
| 6,738,764 B2 | 5/2004 | Mao et al. | 707/5 |
| 6,763,362 B2 | 7/2004 | McKeeth | 707/104.1 |
| 6,766,316 B2 | 7/2004 | Caudill et al. | 707/3 |
| 6,766,422 B2 | 7/2004 | Beyda | 711/137 |
| 6,775,659 B2 | 8/2004 | Clifton-Bligh | 707/1 |
| 6,775,664 B2 | 8/2004 | Lang et al. | 707/5 |
| 6,778,997 B2 | 8/2004 | Sundaresan et al. | 707/104.1 |
| 6,829,606 B2 | 12/2004 | Ripley | 707/5 |
| 6,862,710 B1 | 3/2005 | Marchisio | 715/501.1 |
| 6,871,202 B2 | 3/2005 | Broder | 707/7 |
| 6,883,135 B1 | 4/2005 | Obata et al. | 715/202 |
| 6,886,010 B2 * | 4/2005 | Kostoff | 707/3 |
| 6,886,129 B1 | 4/2005 | Raghavan et al. | 715/501.1 |
| 6,910,029 B1 | 6/2005 | Sundaresan | 707/2 |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | 707/3 |
| 6,947,930 B2 | 9/2005 | Anick et al. | 707/5 |
| 6,959,326 B1 | 10/2005 | Day et al. | 709/217 |
| 6,973,490 B1 | 12/2005 | Robertson et al. | 709/224 |
| 6,990,628 B1 | 1/2006 | Palmer et al. | 707/501 |
| 7,016,540 B1 | 3/2006 | Gong et al. | 382/225 |
| 7,028,029 B2 * | 4/2006 | Kamvar et al. | 707/5 |
| 7,039,234 B2 | 5/2006 | Geidl et al. | 382/187 |
| 7,051,023 B2 * | 5/2006 | Kapur et al. | 707/5 |
| 7,072,888 B1 | 7/2006 | Perkins | 707/10 |
| 7,076,483 B2 | 7/2006 | Preda et al. | 707/5 |
| 7,080,073 B1 | 7/2006 | Jiang et al. | 707/7 |
| 7,107,218 B1 | 9/2006 | Preston | 704/270 |
| 7,152,059 B2 | 12/2006 | Monteverde | 707/3 |
| 7,181,438 B1 * | 2/2007 | Szabo | 707/2 |
| 7,197,497 B2 * | 3/2007 | Cossock | 707/7 |
| 7,231,399 B1 | 6/2007 | Bem et al. | 707/102 |
| 7,243,102 B1 * | 7/2007 | Naam et al. | 707/7 |
| 7,246,128 B2 | 7/2007 | Jordahl | 707/100 |
| 7,257,574 B2 | 8/2007 | Parikh | 707/3 |
| 7,257,577 B2 * | 8/2007 | Fagin et al. | 707/7 |
| 7,260,573 B1 | 8/2007 | Jeh et al. | 707/7 |
| 7,281,002 B2 | 10/2007 | Farrell | 707/3 |
| 7,308,643 B1 | 12/2007 | Zhu et al. | 715/206 |
| 7,328,401 B2 | 2/2008 | Obata et al. | 707/3 |
| 7,386,527 B2 | 6/2008 | Harris et al. | 706/59 |
| 7,428,530 B2 | 9/2008 | Ramarathnam et al. | 707/3 |
| 7,519,529 B1 | 4/2009 | Horvitz | 704/7 |
| 2001/0042076 A1 | 11/2001 | Fukuda | 707/500 |
| 2002/0055940 A1 | 5/2002 | Elkan | 707/104.1 |
| 2002/0062323 A1 | 5/2002 | Takatori et al. | 707/514 |
| 2002/0078045 A1 | 6/2002 | Dutta | 707/7 |
| 2002/0099694 A1 | 7/2002 | Diamond et al. | 707/3 |
| 2002/0103798 A1 | 8/2002 | Abrol et al. | 707/5 |
| 2002/0107861 A1 | 8/2002 | Clendinning et al. | 77/101 |
| 2002/0107886 A1 | 8/2002 | Gentner et al. | 707/511 |
| 2002/0129014 A1 * | 9/2002 | Kim et al. | 707/5 |
| 2002/0169595 A1 | 11/2002 | Agichtein et al. | 704/9 |
| 2002/0169770 A1 | 11/2002 | Kim et al. | 707/5 |
| 2003/0037074 A1 * | 2/2003 | Dwork et al. | 707/500 |
| 2003/0053084 A1 | 3/2003 | Geidl et al. | 358/1.5 |
| 2003/0061201 A1 | 3/2003 | Grefenstette et al. | 707/3 |
| 2003/0065706 A1 | 4/2003 | Smyth et al. | 709/200 |
| 2003/0074368 A1 * | 4/2003 | Schuetze et al. | 707/103 R |
| 2003/0208482 A1 | 11/2003 | Kim et al. | 707/3 |
| 2003/0217007 A1 | 11/2003 | Fukushima et al. | 705/51 |
| 2003/0217047 A1 | 11/2003 | Marchisio | 707/3 |
| 2003/0217052 A1 | 11/2003 | Rubenczyk et al. | 707/3 |
| 2004/0003028 A1 | 1/2004 | Emmett et al. | 709/203 |
| 2004/0006559 A1 | 1/2004 | Gange et al. | 707/3 |
| 2004/0049766 A1 | 3/2004 | Bloch et al. | 717/121 |
| 2004/0093328 A1 | 5/2004 | Damle | 707/3 |
| 2004/0111408 A1 | 6/2004 | Caudill et al. | 707/3 |
| 2004/0117351 A1 | 6/2004 | Challapalli et al. | 707/2 |
| 2004/0148278 A1 | 7/2004 | Milo et al. | 707/3 |
| 2004/0181515 A1 * | 9/2004 | Ullmann et al. | 707/3 |
| 2004/0186827 A1 | 9/2004 | Anick et al. | 707/3 |
| 2004/0194099 A1 | 9/2004 | Lamping et al. | 718/100 |
| 2004/0199497 A1 | 10/2004 | Timmons | 707/3 |
| 2004/0205497 A1 | 10/2004 | Alexander et al. | 715/501.1 |
| 2004/0215606 A1 * | 10/2004 | Cossock | 707/3 |
| 2004/0215664 A1 | 10/2004 | Hennings et al. | 707/104.1 |
| 2004/0254932 A1 * | 12/2004 | Gupta et al. | 707/7 |
| 2005/0033742 A1 | 2/2005 | Kamvar et al. | 707/7 |
| 2005/0044071 A1 | 2/2005 | Cho et al. | 707/3 |
| 2005/0055340 A1 | 3/2005 | Dresden | 707/3 |
| 2005/0055347 A9 | 3/2005 | Cho et al. | 707/5 |
| 2005/0060186 A1 | 3/2005 | Blowers et al. | 705/2 |
| 2005/0060304 A1 | 3/2005 | Parikh | 707/3 |
| 2005/0060311 A1 | 3/2005 | Tong et al. | 707/1 |
| 2005/0071328 A1 * | 3/2005 | Lawrence | 707/3 |
| 2005/0071741 A1 * | 3/2005 | Acharya et al. | 715/500 |

| | | | |
|---|---|---|---|
| 2005/0086192 A1 | 4/2005 | Kodama | 707/1 |
| 2005/0086206 A1 | 4/2005 | Balasubramanian et al. | 707/3 |
| 2005/0086583 A1 | 4/2005 | Obata et al. | 715/229 |
| 2005/0144162 A1* | 6/2005 | Liang | 707/3 |
| 2005/0154746 A1* | 7/2005 | Liu et al. | 707/101 |
| 2005/0165781 A1* | 7/2005 | Kraft et al. | 707/7 |
| 2005/0187965 A1 | 8/2005 | Abajian | 707/102 |
| 2005/0192936 A1 | 9/2005 | Meek et al. | 707/3 |
| 2005/0192955 A1 | 9/2005 | Farrell | 707/5 |
| 2005/0210006 A1 | 9/2005 | Robertson | 707/3 |
| 2005/0216533 A1 | 9/2005 | Berkhin | 707/204 |
| 2005/0240580 A1* | 10/2005 | Zamir et al. | 707/4 |
| 2005/0251499 A1 | 11/2005 | Huang | 707/1 |
| 2005/0262050 A1 | 11/2005 | Fagin et al. | 707/3 |
| 2005/0283473 A1 | 12/2005 | Rousso et al. | 707/5 |
| 2006/0036598 A1 | 2/2006 | Wu | 707/5 |
| 2006/0047649 A1 | 3/2006 | Liang | 707/4 |
| 2006/0161534 A1 | 7/2006 | Carson et al. | 707/3 |
| 2006/0173560 A1 | 8/2006 | Widrow | 700/48 |
| 2006/0195440 A1 | 8/2006 | Burges et al. | 707/5 |
| 2006/0206460 A1 | 9/2006 | Gadkari et al. | 707/3 |
| 2006/0206476 A1 | 9/2006 | Kapur et al. | 707/5 |
| 2006/0282455 A1 | 12/2006 | Lee et al. | 707/102 |
| 2006/0287993 A1 | 12/2006 | Yao et al. | 707/4 |
| 2007/0038616 A1 | 2/2007 | Guha | 707/4 |
| 2007/0038622 A1 | 2/2007 | Meyerzon et al. | 705/5 |
| 2007/0073748 A1 | 3/2007 | Barney | 707/101 |
| 2007/0106659 A1 | 5/2007 | Lu et al. | 707/7 |
| 2007/0150473 A1 | 6/2007 | Li et al. | 707/7 |
| 2007/0198459 A1 | 8/2007 | Boone et al. | 707/1 |
| 2007/0276829 A1 | 11/2007 | Wang et al. | 707/7 |

FOREIGN PATENT DOCUMENTS

| | | | |
|---|---|---|---|
| EP | 0950961 A2 | 10/1999 | |
| EP | 0950961 A3 | 10/1999 | |
| EP | 1050830 A2 | 11/2000 | |
| EP | 1120717 A2 | 8/2001 | |
| EP | 1282060 A2 | 2/2003 | |
| EP | 1557770 A1 | 7/2005 | |
| JP | 10091638 | 4/1998 | |
| JP | 11328191 | 11/1999 | |
| JP | 2002-091843 | 3/2002 | |
| JP | 2003-248696 | 9/2003 | |
| KR | 10-2002-0015838 A | 3/2002 | |
| KR | 10-2003-0082109 A | 10/2003 | |
| KR | 10-2006-0116042 A | 11/2006 | |

OTHER PUBLICATIONS

Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.

Brin, S. et al., "The Anatomy of a Large-Scale Hypertextual Web Search Engine", In Proceedings of the 7th International World Wide Web Conference, Brisbane, Australia, pp. 107-117, 1998.

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.

Manning, C. et al., "CS276A Text Information Retrieval, Mining, and Exploitation: Lecture 12", Stanford University CS276A/SYMBSYS2391/LING2391/LING2391 Test Information Retrieval, Mining, and Exploitation, Fall 2002, last modified Nov. 18, 2002, 8 pgs.

Jones, K. et al., "A probabilistic model of information retrieval: development and status", Department of Information Science, City University, London, Aug. 1998, 74 pgs.

Numerico, T., "Search engines organization of information and Web Topology", http://www.cafm.lsbu.ac.uk/eminars/sse/numerico-6-dec-2004.pdf, Dec. 6, 2004, 32 pgs.

Zamir, O. et al., "Grouper: A Dynamic Clustering Interface to Web Search Results", Computer Networks (Amsterdam, Netherlands: 1999), 31(11-16): 1361-1374, 1999.

Losee, R. et al., "Research in Information Organization", Literature Review, School of Information and Library Science, Section 4, pp. 53-96, Jan. 2001.

Fagin, R. et al., "Searching the Workplace Web", IBM Almaden Research Center, In Proceedings of the Twelfth International World Wide Web Conference, Budapest, 2003, 21 pgs.

Singhal, A. et al., "AT&T at TREC-9", Proceedings of the Ninth Text Retrieval Conference, NIST Special Publication 500-249, 'Online! pp. 103-105.

Westerveld, T. et al., "Retrieving Web pages using Content, Links, URLs and Anchors", Proceedings of the Tenth Text Retrieval Conference, NIST Special Publication, 'Online! Oct. 2001, pp. 1-10.

Cutler, M. et al., "A New Study on Using HTML Structures to Improve Retrieval", 11th IEEE International Conference on Chicago, IL, Nov. 9-11, 1999, pp. 406-409.

Brin, S. et al., "The Anatomy of a Large-Scale Hypertextual Web Search Engine", Proceedings of the Seventh International World-Wide Web Conference, 'Online! Apr. 14, 1998, pp. 1-26.

Carmel, D. et al., "Searching XML Documents Via XML Fragments", SIGIR Toronto, Canada, Jul.-Aug. 2003, pp. 151-158.

Craswell, N. et al., "TREC12 Web Track as CSIRO", TREC 12, Nov. 2003, 11 pp.

Hawking, D. et al., "Overview of the TREC-8 Web Track", TREC, Feb. 2000, pp. 1-18.

Hawking, D., "Overview of the TREC-9 Track", TREC, 2000, pp. 1-16.

Hawking., D. et al., "Overvew of TREC-7 Very Large Collection Track", TREC, Jan. 1999, pp 1-13.

Heery, Rachel, "Review of Metadata Formats", Program, vol. 30, No. 4, Oct. 1996, 1996 IEEE, pp. 345-373.

Kotsakis, E., "Structured Information Retrieval in XML Documents", Proceedings of the ACM Symposium on Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.

Lalmas, M., "Uniform Representation of Content and Structure for Structed Document Retrieval", $20^{th}$ SGES International Conference on Knowledge Based Systems and Applied Artificial Intelligence, Cambridge, UK, Dec. 2000, pp. 1-12.

Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.

Nelson, Chris, "Use of Metadata Registries for Searching for Statistical Data", IEEE 2002, Dimension EDI Ltd., pp. 232-235, 2002.

Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.

Robertson, S. et al., "Okapi at TREC-4", 1996, 24 pp.

Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.

Schulz, Stefan, et al., "Indexing Medical WWW Documents by Morphemes", MEDINFO 2001 Proceedings of the $10^{th}$ World Congress on Medical Informatics, Park I, IOS Press, Inc., pp. 266-270, 2001.

Sturdy, Derek, "Squirrels and nuts: metadata and knowledge management", Business Information Review, 18(4), pp. 34-42, Dec. 2001.

Voorhees, E., "Overview of TREC 2002", Gaithersburg, Maryland, Nov. 19-22, 15 pp.

Web Page "Reuters: Reuters Corpus", http://about.reuter.com/researchandstandards/corpus/, viewed Mar. 18, 2004.

Wilkinson, R., "Effective Retrieval of Structured Documents", Annual ACM Conference on Research and Development, 1994, 7 pp.

Yi, Jeonghe,e et al., "Metadata Based Web Mining for Topic-Specific Information Gathering", IEEE, pp. 359-368, 2000.

Yi, Jeonghee, et al., "Using Metadata to Enhance Web Information Gathering", D.Suciu and G. Vossen (eds.): WebDB 2000, LNCS 1997, pp. 38-57, 2001.

"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.

"Microsoft Full-Text Search Technologies", http://www.microsoft.com/technet/prodtechnol/sppt/sharepoint/evaluate/featfunc/mssearc . . . , published on Jun. 1, 2001, printed on May 22, 2006, 13 pp.

"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

"SharePoint Porter Server 2001 Planning and Installation Guide", http://www.microsoft.com/technet/prodtechnol/sppt/sharepoint/plan/planinst.mspx, printed on May 22, 2006, 86 pp.

U.S. Appl. No. 11/019,091, filed Dec. 21, 2004 entitled "Ranking Search Results Using Featured Extraction".

U.S. Appl. No. 11/073,381, filed Mar. 3, 2005 entiled "System and Method for Ranking Search Results Using File Types".

U.S. Appl. No. 10/804,326, filed Mar. 18, 2004 entitled "Field Weighting in Text Document Searching".

U.S. Appl. No. 10/609,315, filed Jun. 27, 2003, entitled "Normalizing Document Metadata Using Directory Services".

U.S. Appl. No. 11/238,906, filed Sep. 29, 2005 entitled "Click Distance Determination".

U.S. Appl. No. 11/412,723, filed Apr. 26, 2006, entitled "Ranking Search Results Using Language Types".

U.S. Appl. No. 10/955,983, filed Sep. 30, 2004 entitled "System and Method for Ranking Search Results Using Click Distance".

Official Action in U.S. Appl. No. 10/609,315 mailed Dec. 15, 2005.

Official Action in U.S. Appl. No. 10/609,315 mailed Jun. 1, 2006.

Najork, Marc et al., "Breadth-First Crawling Yields High-Quality Pages", ACM, Compaq Systems Research Center, Hong Kong, 2001, pp. 114-118.

Cho et al., "Efficient Crawling Through URL Ordering", In Proceedings of the 7th International World Wide Web Conference, Apr. 1998, pp. 161-180.

Chakrabarti, S., "Recent Results in Automatic Web Resource Discovery", ACM Computing Surveys, vol. 31, No. 4es, Dec. 1999, pp. 1-7.

Lam et al., "Automatic Document Classification Based on Probabilistic Reasoning: Model and Performance Analysis", IEEE, 1997, pp. 2719-2723.

Lee, J.K.W. et al., "Intelligent Agents for Matching Information Providers and Consumers on the Worl-Wide Web", IEEE, 1997, pp. 189-199.

Huang et al., "Design and Implementation of a Chinese Full-Text Retrieval System Based on Probabilistic Model", IEEE, 1993, pp. 1090-1093.

Yuwono, Budi and Lee, Dik L., "Search and Ranking Algorithms for Locating Resources on the World Wide Web", IEEE, 1996, pp. 164-170.

U.S. Official Action in U.S. Appl. No. 10/981,962 mailed Apr. 5, 2006.

U.S. Official Action in U.S. Appl. No. 10/981,962 mailed Sep. 21, 2006.

U.S. Official Action in U.S. Appl. No. 10/804,326 mailed Oct. 16, 2006.

U.S. Official Action in U.S. Appl. No. 10/955,983 mailed Mar. 22, 2007.

U.S. Official Action in U.S. Appl. No. 10/981,962 mailed Apr. 30, 2007.

U.S. Official Action in U.S. Appl. No. 11/019,091 mailed Jun. 20, 2007.

U.S. Official Action in U.S. Appl. No. 10/955,983 mailed Nov. 13, 2007.

U.S. Official Action in U.S. Appl. No. 10/804,326 mailed Dec. 11, 2007.

U.S. Official Action in U.S. Appl. No. 11/238,906 mailed Jan. 8, 2008.

U.S. Official Action in U.S. Appl. No. 10/981,962 mailed Mar. 17, 2008.

U.S. Official Action in U.S. Appl. No. 11/412,723 mailed May 28, 2008.

U.S. Official Action in U.S. Appl. No. 11/019,091 mailed Apr. 3, 2008.

EP Search Report in EP 00309121 mailed Jul. 18, 2002.

EP Exam Report in EP 00309121.2-1522 mailed Jul. 4, 2003.

EP Exam Report in EP 00309121.2-1527 mailed Jun. 16, 2004.

EP Search Report in EP 05105110 dated Aug. 11, 2006.

EP Exam Report in EP 00309121.2-1527 mailed Feb. 8, 2007.

Wen, Jl-Rong, "Query Clustering Using User Logs", Jan. 2002, pp. 59-81.

U.S. Appl. No. 11/874,844 filed Oct. 18, 2007 entitled "Enterprise Relevancy Ranking Using a Neural Network".

U.S. Appl. No. 11/874,579 filed Oct. 18, 2007 entitled "Ranking and Providing Search Results Based in Part on a Number Of Click-Through Features".

U.S. Appl. No. 12/207,910 filed Sep. 10, 2008 entitled "Document Length as a Static Relevance Feature for Ranking Search Results".

Chen, Michael et al., Cha Cha, "A System for Organizing Intranet Search Results", Computer Science Department, University of California, Berkeley, 1999, pp. 1-12.

U.S. Appl. No. 09/493,748 filed Jan. 28, 2000 entitled "Adaptive Web Crawling Using a Statistical Model".

U.S. Official Action in U.S. Appl. No. 10/804,326 mailed Jun. 7, 2007.

U.S. Official Action in U.S. Appl. No. 10/955,983 mailed Jul. 21, 2008.

U.S. Official Action in U.S. Appl. No. 10/804,326 mailed Dec. 10, 2008.

U.S. Official Action in U.S. Appl. No. 11/019,091 mailed Dec. 11, 2008.

U.S. Official Action in U.S. Appl. No. 10/955,983 mailed Dec. 18, 2008.

U.S. Official Action in U.S. Appl. No. 11/206,286 mailed Dec. 24, 2008.

Chinese Second Official Action in 200510088527.5 mailed Dec. 26, 2008.

Smyth Barry,, "Relevance at a Distance - An Investigation of Distance-Biased Personalization on the Mobile Internet", no date, pp. 1-6.

Senecal, Sylvain, "Consumers' Decision-Making Process and Their Online Shopping Behavior: A Clickstream Analysis", Jun. 1, 2004, pp. 1600-1607.

Fagin, Ronald, "Searching the Workplace Web", Mar. 3, 2005, pp. 1-10.

Agichten et al., "Improving Web Search Ranking by Incorporating User Behavior Information"—http://www.mathcs.emory.edu/~eugene/papers/sigir2006ranking.pdf, 8 pp.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, pp. 585-593.

Burges, Christopher J.C. et al. "Learning to Rank with Nonsmooth Cost Functions"—http://books.nips.cc/papers/txt/nips19/NIPS2006 0574.txt, 2 pp.

Filip Radlinski, et al.,, "Query Chains: Learning to Rank from Implicit Feedback, "http://delivery.acm.org/10.1145/1090000/1081899/p239-radlinski.pdf?key1=1081899&key2=3628533811&coll=GUIDE& CFID=27212902&CFTOKEN=53118399, *KDD*'05, Chicago, IL, Aug. 21-24, 2005,10 pages.

Irina Matveeva, et al., "High Accuracy Retrieval with Multiple Nested Ranker," http://people.cs.uchicago.edu/~matveeva/RankerSIGIR06.pdf, *SIGIR*'06, Seattle, WA Aug. 6-11, 2006, 8 pages.

Gui-Rong Xue, et al., "Optimizing Web Search Using Web Click-Through Data," http://people.cs.vt.edu/~xwensi/Publication/p118-xue.pdf, *CIKM*'04, Nov. 8-13, 2004, 9 pages.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

MSDN, "Understanding Ranking," http://msdn.microsoft.com/en-us/library/ms142524.aspx, Sep. 2007, 4 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

U.S. Official Action in U.S. Appl. No. 11/073,381 mailed Sep. 18, 2007.

U.S. Official Action in U.S. Appl. No. 11/073,381 mailed Jul. 10, 2008.

U.S. Official Action in U.S. Appl. No. 11/206,286 mailed Jul. 14, 2008.

U.S. Official Action in U.S. Appl. No. 11/238,906 mailed Sep. 16, 2008.

PCT Search Report in PCT/US2006/031965 mailed Jan. 11, 2007.

EP Exam Report in EP 05105048.2-2201 mailed Apr. 23, 2007.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

U.S. Official Action in U.S. Appl. No. 11/412,723 mailed Mar. 6, 2009.

U.S. Official Action in U.S. Appl. No. 11/073,381 mailed Apr. 15, 2009.

PCT Search Report in PCT/US2008/011894 mailed Feb. 27, 2009.

Chinese Final Rejection in 200510088213.5 mailed Mar. 6, 2009.

U.S. Official Action in U.S. Appl. No. 11/019,091 mailed Sep. 1, 2009.

U.S. Official Action in U.S. Appl. No. 11/412,723 mailed Sep. 3, 2009.

Chen, Hsinchun et al., "A Smart Itsy Bitsy Spider for the Web", Journal of the American Society for Information Science, 49(7), 1998, pp. 604-618.

Kleinberg, Jon M., "Authoritative Sources in a Hyperlinked Environment", Proceedings of the aCM-SIAM symposium on Discrete Algorithms, 1998, 34 pp.

U.S. Official Action in U.S. Appl. No. 11/238,906 mailed May 19, 2009.

U.S. Official Action in U.S. Appl. No. 10/955,983 mailed Jun. 10, 2009.

Chinese First Official Action mailed Jun. 19, 2009 in 200680029645.1.

Chinese First Official Action mailed Jun. 19, 2009 in 200680035828.4.

* cited by examiner

Fig. 6

SYSTEM AND METHOD FOR INCORPORATING ANCHOR TEXT INTO RANKING SEARCH RESULTS

CROSS-REFERENCE TO RELATED APPLICATIONS

The present invention is related to a patent application having Ser. No. 10/804,326, entitled "Field Weighting in Text Document Searching", filed on Mar. 18, 2004. The related applications are assigned to the assignee of the present patent application and are hereby incorporated by reference.

BACKGROUND OF THE INVENTION

In a text document search, a user typically enters a query into a search engine. The search engine evaluates the query against a database of indexed documents and returns a ranked list of documents that best satisfy the query. A score, representing a measure of how well the document satisfies the query, is algorithmically generated by the search engine. Commonly-used scoring algorithms rely on splitting the query up into search terms and using statistical information about the occurrence of individual terms in the body of text documents to be searched. The documents are listed in rank order according to their corresponding scores so the user can see the best matching search results at the top of the search results list.

Many such scoring algorithms assume that each document is a single, undifferentiated string of text. The query of search terms is applied to the text string (or more accurately, to the statistics generated from the undifferentiated text string that represents each document). However, documents often have some internal structure (e.g., fields containing titles, section headings, metadata fields, etc.), and reducing such documents to an undifferentiated text string loses any searching benefit provided by such structural information.

Some existing approaches attempt to incorporate the internal structure of documents into a search by generating statistics for individual document fields and generating scores for individual fields. The score for an individual document is then computed as a weighted sum of scores for its fields. Some existing approaches attempt to incorporate the internal structure of the document, but do not attempt to take into consideration text about that document contained in other documents.

SUMMARY OF THE INVENTION

Embodiments of the present invention are related to a system and method for ranking search results using a scoring function that incorporates an anchor text component. Anchor text consists of a URL (Uniform Resource Locator) pointing to another document and an accompanying textual description. This text is directly relevant to the target document, and is used in the present invention to provide a measure of the relevance of the target document. For example, document A has some anchor text pointing to document B. If the anchor text contains a word that is not in document B, queries containing this word will not return the linked document without the additional functionality provided by the present invention. Only Document A would be returned but not document B. Since the description in document A is used to describe the linked document B, this text is highly likely to be a precise summary/description of the linked document. The present invention corrects for this deficiency by incorporating the anchor text into the ranking of the target document.

In one aspect of the present invention, the network is first "crawled" to generate a table of properties associated with the links and pages of the network. "Crawling" refers to automatically collecting several documents (or any analogous discrete unit of information) into a database referred to as an index. Crawling traverses multiple documents on the network by following document reference links within certain documents, and then processing each document as found. The documents are processed by identifying key words or general text in the documents to create the index. The index of the present invention includes a separate anchor text index partition. The text that the present invention indexes is not limited to just the anchor text that accompanies URLs. Anchor text can also include text with references to any other objects. For example, people, categories, directories, etc. may also be indexed.

In another aspect of the present invention, once the anchor text is indexed and associated with the appropriate target document the anchor text is also used for boosting document ranking. The term frequencies of terms that exist in both the content and the anchor text are combined, so that the total occurrence of a term in the document is boosted. The length of the target document is also lengthened by the anchor text from the source documents that point to that particular target document. Both of these are factors are used in a scoring function that determines the document's relevance measure.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
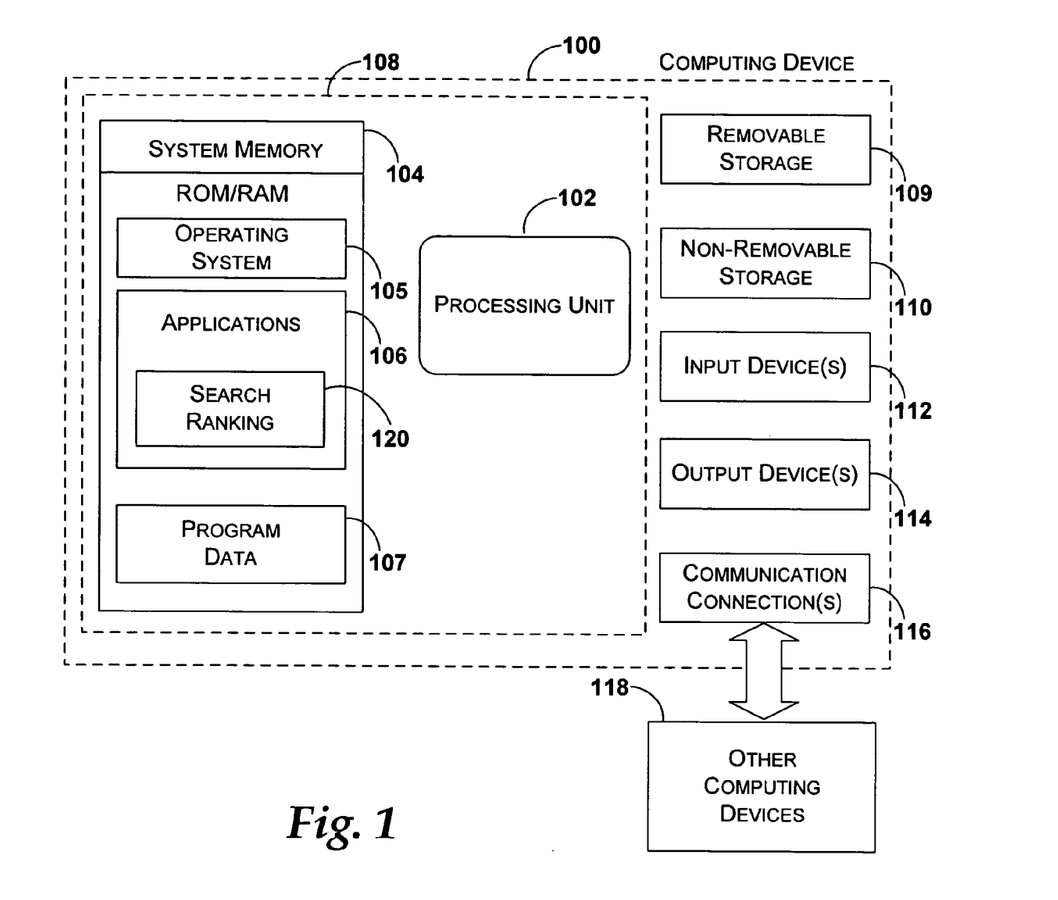
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search ranking application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Incorporating Anchor Text into Search Ranking

Embodiments of the present invention are related to a ranking function for a search engine. The quality of a search engine is typically determined by the relevance of the documents according to the ranks assigned by the ranking function. Anchor text is defined as text within the anchor tag of HTML (<A href=http://example>Example Web</A>). Often, anchor text contains short high quality description of the target URL (Uniform Resource Locator) and it is beneficial for the ranking function to incorporate content of the anchor tags that point to the given document into the ranking function for that document.

Figure 2:
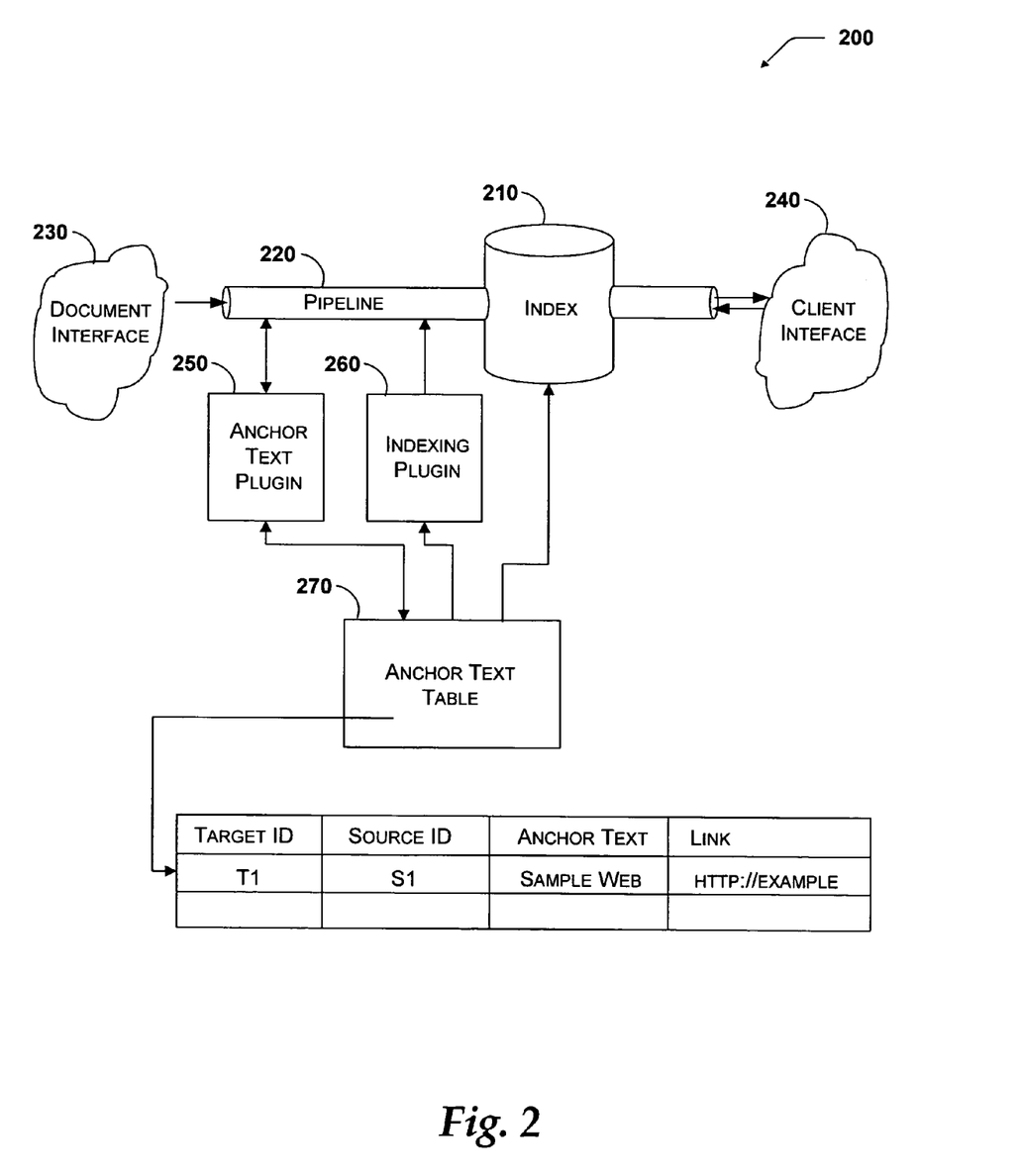
FIG. 2 illustrates a functional block diagram of an exemplary system for scoping searches using index keys in accordance with the present invention.

FIG. 2 illustrates a functional block diagram of an exemplary system for scoping searches using index keys in accordance with the present invention. System 200 includes index 210, pipeline 220, document interface 230, client interface 240, anchor text plugin 250, indexing plugin 260, and anchor text table 270.

Index 210 is structured to include separate index partitions that includes a main partition and another partition for the anchor text. A more detailed description of the structure of index 210 is provided below in the discussion of FIG. 3. The records of these indexes are used to in providing results to client queries. In one embodiment, index 210 corresponds to multiple databases that collectively provide the storage for the index records.

Pipeline 220 is an illustrative representation of the gathering mechanism for obtaining the documents or records of the documents for indexing. Pipeline 220 allows for filtering of data by various plugins (e.g., anchor text plugin 250) before the records corresponding to the data are entered into index 210.

Document interface 230 provides the protocols, network access points, and database access points for retrieving documents across multiple databases and network locations. For example, document interface 230 may provide access to the Internet while also providing access to a database of a local server and access to a database on the current computing device. Other embodiments may access other document locations using a variety of protocols without departing from the spirit or scope of the invention.

Client Interface 240 provides access by a client to define and initiate a search. The search may be defined according to keywords and/or scope keys. An exemplary method for processing search queries in ranking search results is described in greater detail in the discussion of FIG. 7 below.

Anchor text plugin 250 is one of several gatherer pipeline plugins. Anchor text plugin 250 identifies the anchor text and its related properties that are included in a document. The anchor properties are gathered by anchor text plugin 250 as the documents provided through document interface 230 are crawled. In one embodiment, the functionality of anchor text plugin 250 is actually included in a properties plugin rather than being provided as a separate plugin. The properties plugin identifies all the fields of a document and their associated properties including the anchor properties. In one embodiment, since anchor text is associated with a target document, associating the target document with the anchor text is deferred until the crawl is complete. For example, when document A is indexed, and document A has anchor text that points to document B, the anchor text is applied to document B. But since document A is being indexed at the moment, this process is deferred. Also, there may be multiple anchors are to be applied to document B requiring that they are discovered before document B is indexed correctly. Deferring, the indexing of the target documents until after the crawl is complete, better ensures the correctness of the indexed results.

Indexing plugin 260 is another plugin connected to pipeline 220. Indexing plugin provides the mechanism for generating, partitioning, and updating index 210. In one embodiment, indexing plugin 260 provides the word lists that temporarily cache the keywords and anchor text keys generated from crawled documents before flushing these results to index 210. The records of index 210 are populated from the crawl results included in these word lists.

Anchor text table 270 includes the anchor properties that have been gathered by anchor text plugin 250. For instance of anchor text in a document, anchor text table 270 includes a record of the anchor text that includes the properties associated with the anchor text. For example, a record in anchor text table 270 may include a target ID that identifies the target document of the link, a source ID that identifies the current document, the anchor text itself, and the link in separate fields. In other embodiments, other fields may be included in anchor text table 270 that are related to linking between two documents. In one embodiment, the anchor and link properties gathered from the crawl are used to generate a representation of the network with nodes corresponding to the documents and branches corresponding to the links (see FIG. 4). This network graph may then be loaded into memory and used to resolve the target IDs for the target documents referred to by the anchor text.

Despite the illustration in system 200 of one-way and two-way communications between functional blocks, any of these communication types may be changed to another type without departing from the spirit or scope of the invention (e.g., all communications may have an acknowledgment message requiring two-way rather than one-way communication).

Figure 3:
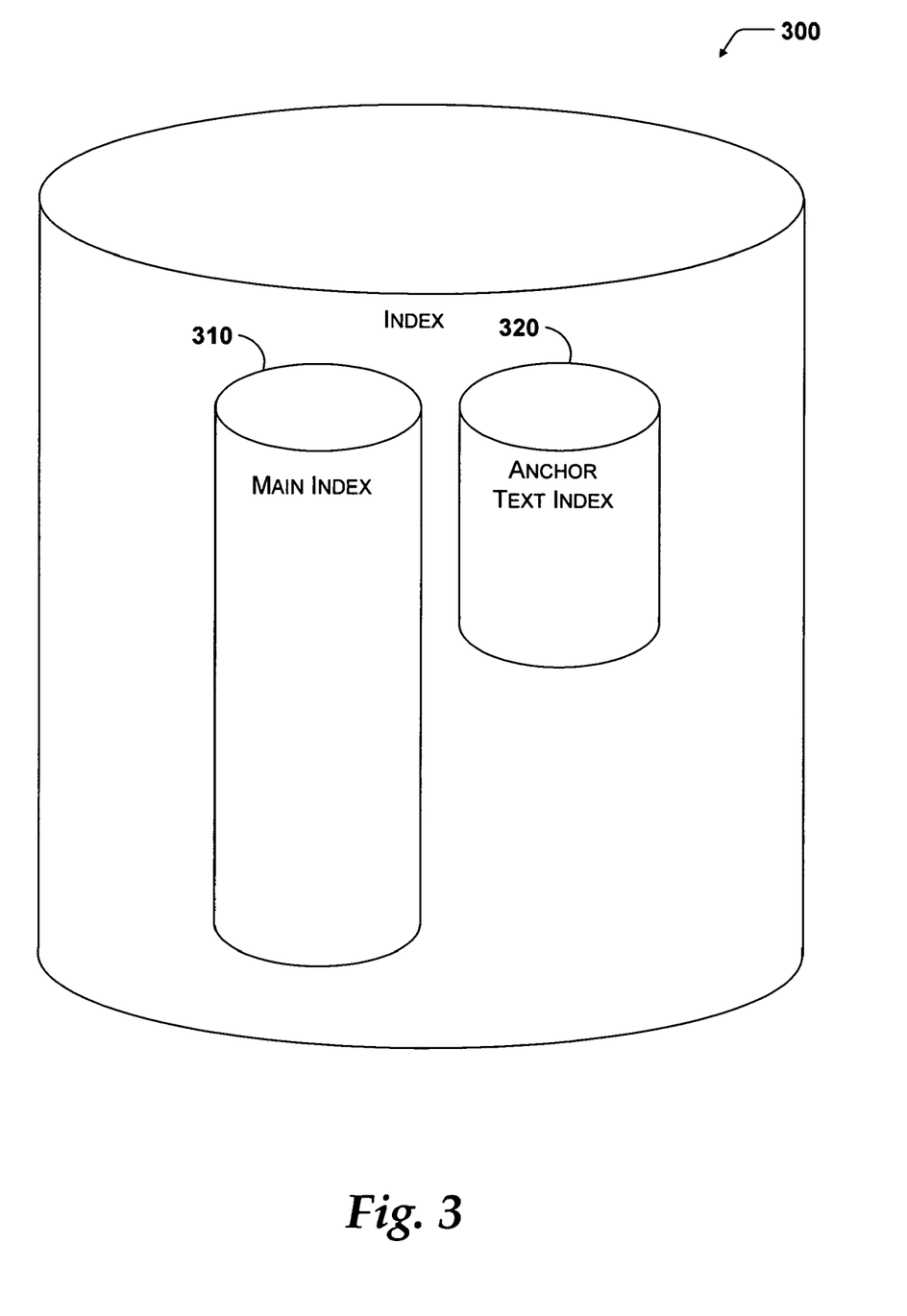
FIG. 3 illustrates a functional block diagram for an exemplary structure of an index in accordance with the present invention.

FIG. 3 illustrates a functional block diagram for an exemplary structure of an index in accordance with the present invention. Index 300 includes main index 310 and anchor text index 320.

Main index 310 includes records that correspond to the keywords and other index keys that are returned corresponding to the crawl of documents. Main index 310 also includes the other index partitions related to other properties of the documents. The records for that correspond to anchor text are diverted and entered into anchor text index 320.

Anchor text index 320 includes records that correspond to the target documents of the anchor text included in documents on the network. These target documents are organized as an inverted index with the target document IDs listed in association with words included in the anchor text or URL associated with the target document. Anchor text index 320 is generated from the anchor text table after the crawl is complete. The anchor text corresponding to each target document is concatenated together in order to evaluate each target document for terms and enter the target document in anchor text index 320. Including a separate index partition for the anchor text allows relevance calculations to made based on the anchor text before incorporating the anchor text as a factor in the scoring function of a document. Incorporating the anchor text into the scoring function for ranking documents is described more fully in the discussion of FIG. 6 below.

Figure 4:
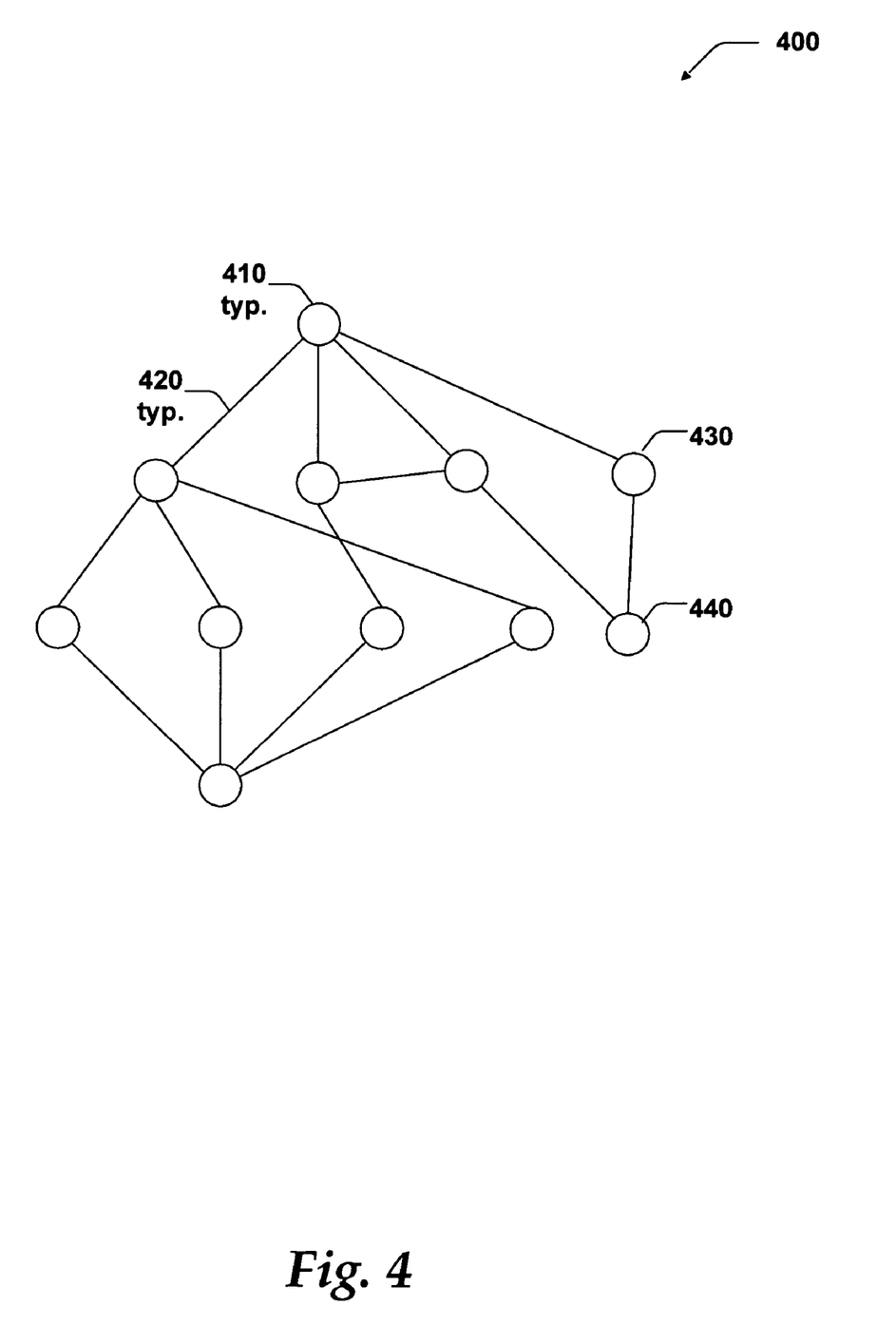
FIG. 4 illustrates an exemplary network graph in accordance with the present invention.

FIG. 4 illustrates an exemplary network graph in accordance with the present invention. The network graph is comprised of nodes (e.g., 410) and edges or links (e.g., 420). The nodes (e.g., 410) represent the pages and other resources that are on the network that may be returned as results to a search query. The links (e.g., 420) connect each one of these pages together through the use of navigation links listed on the pages. A set of link information may be gathered for each page that can be used in determining properties related to the anchor text for a particular page.

In one embodiment, node 430 is the current document that includes an anchor tag for the target document that corresponds to node 440. For example, the anchor tag may correspond to anchor tag of HTML (<A href=http://example>Sample Web</A>). The ID of the current document is also known, usually being included in the HTML of the document. In order to populate the anchor text table (see FIG. 2) the target document ID still needs to be resolved that is associated with the anchor text. Network graph 400 assists in resolving the target document ID by providing a representation of the network that may be walked to resolve unknown properties.

Figure 5:
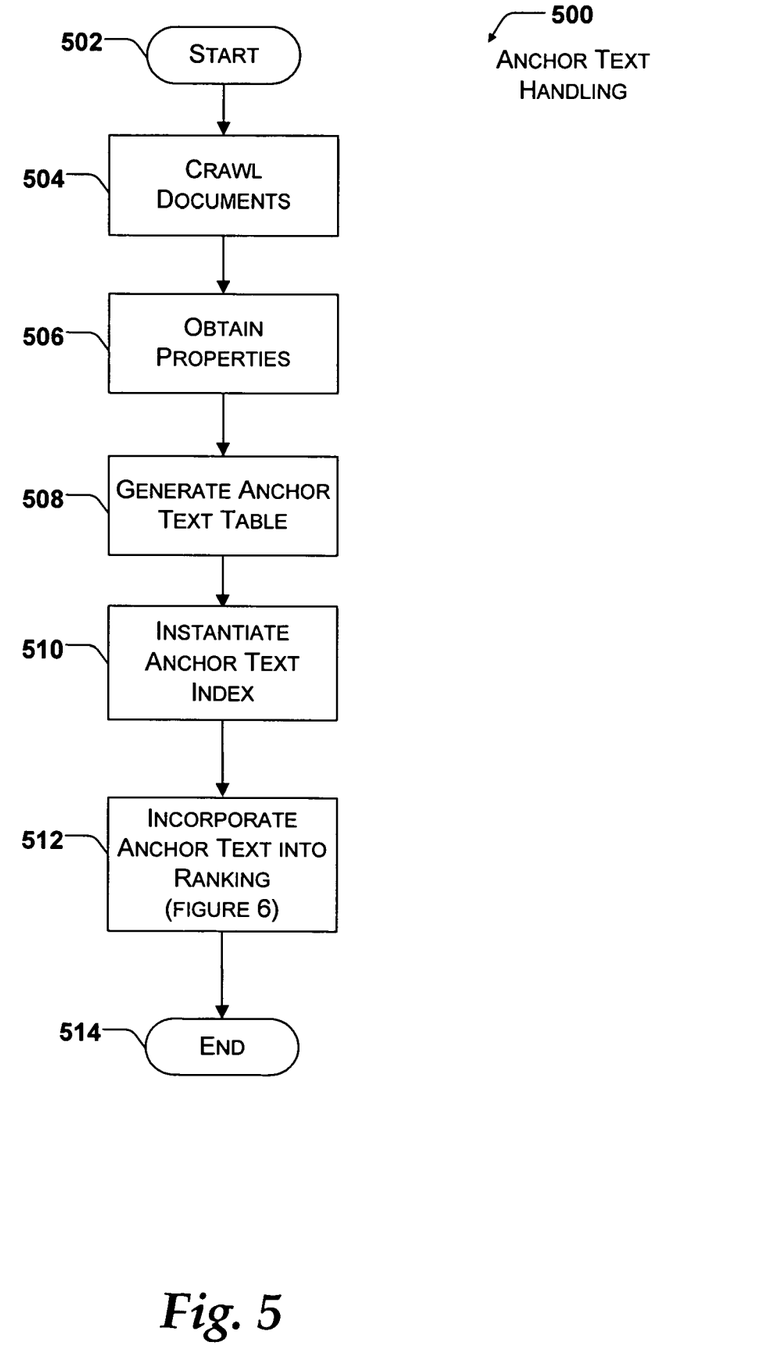
FIG. 5 illustrates a logical flow diagram of an exemplary process for handling anchor text to include the anchor text in document ranking in accordance with the present invention.

FIG. 5 illustrates a logical flow diagram of an exemplary process for handling anchor text to include the anchor text in document ranking in accordance with the present invention. Process 500 starts at block 502 where access is provided to a corpus of documents. Processing continues at block 504.

At block 504, the corpus of documents are crawled to determine the documents that exist as well as properties (e.g., file type) that are associated with those documents. An identifier or ID for each of the documents and their associated properties are then forwarded as results of the crawl. Processing continues at block 506.

At block 506, the properties associated with the documents that relate to anchor text obtained by an anchor text plugin. The anchor text properties may include an identifier of the source document, and identifier of the target document, the anchor text itself, and the URL of the link. Once these anchor properties are gathered, processing moves to block 508.

At block 508, the anchor text table is generated. The anchor text table includes the anchor text properties associated with each instance of anchor text. The properties of each instance of anchor text are stored as records in the table. Once the table is created, processing continues at block 510.

At block 510, an index is generated that includes a main index and an anchor text index. In one embodiment, the index is generated after anchor text table is built. The anchor text table includes an inverted list of documents associated with anchor text keys. The anchor text keys correspond to the anchor text, in that they are keywords contained in the anchor text or URL of the target document of an anchor tag. Accordingly, the inverted list of documents, are the target documents of the anchor text keys. Once the index is instantiated, processing continues at block 512.

At block 512, the main index and anchor text index are consulted along with the anchor text table to incorporate relevance values based on the anchor text a scoring function. The scoring function determines a relative score for a document. The documents can then be ranked according to their scores. A more detailed description of incorporating anchor text into ranking the documents is described in the discussion of FIG. 6 below. Once anchor text is incorporated into the ranking, processing advances to block 514 where process 500 ends.

After process 500 is complete, the ranked documents may be returned to the user by the various operations associated with the transmission and display of results by a search engine. The documents corresponding to the higher precision results may then be selected and viewed at the user' discretion.

Figure 6:
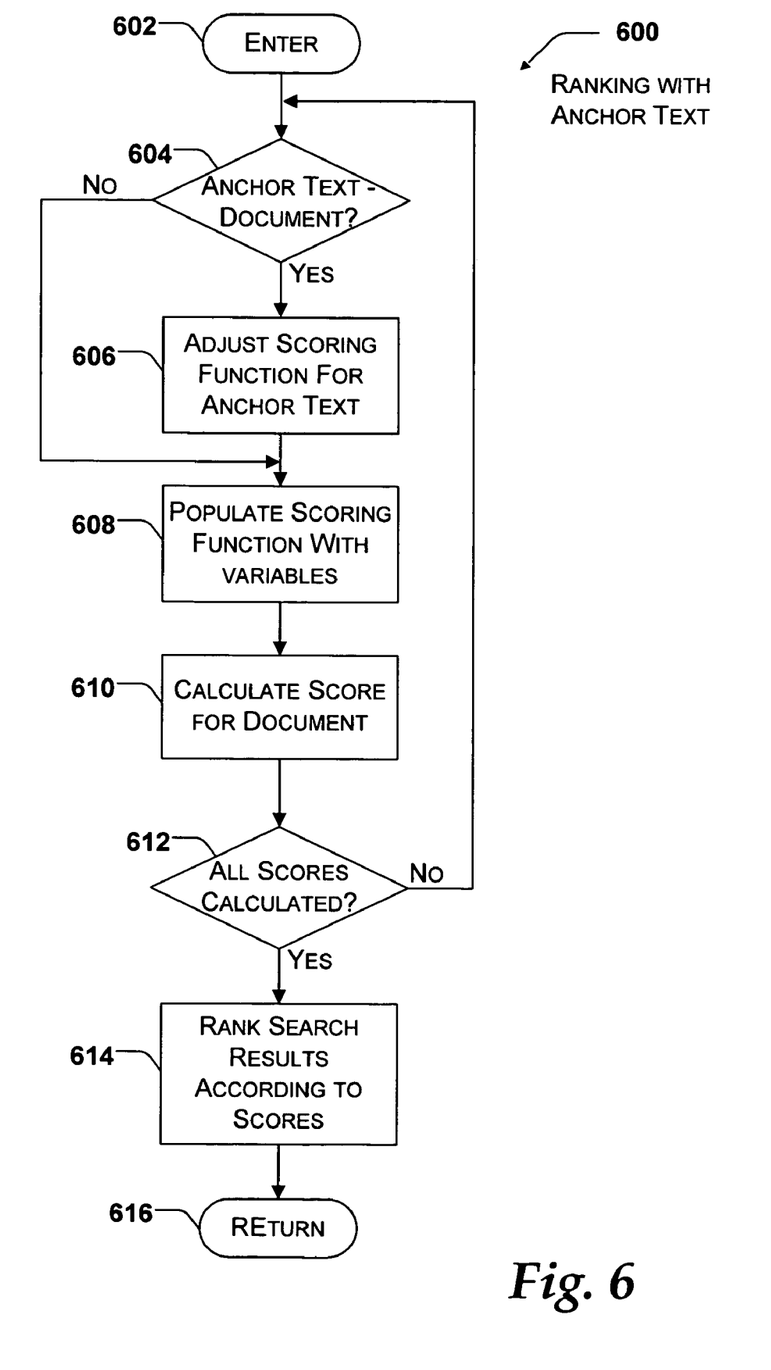
FIG. 6 illustrates a logical flow diagram of an exemplary process for incorporating anchor text in ranking search results in accordance with the present invention.

FIG. 6 illustrates a logical flow diagram of an exemplary process for incorporating anchor text in ranking search results in accordance with the present invention. Process 600 starts at block 602 when process 500 of FIG. 5 enters block 512 and a query has been made by a client. Processing continues at decision block 604.

At decision block 604, a determination is made whether the document for which the current score is being calculated is included in the anchor text index for the word being queried. If the document is not listed in the anchor text index, processing moves to block 608. However, if the document is listed in the anchor text index, processing continues at block 606.

At block 606, a scoring function for determining a relevance score of a document is adjusted to incorporate consideration and weighting of the anchor text. In one embodiment, the scoring function corresponds to the field weighted scoring function described in patent application Ser. No. 10/804,326, entitled "Field Weighting in Text Document Searching", filed on Mar. 18, 2004 and hereby incorporated by reference. As provided by the Ser. No. 10/804,326 patent application the following is a representation of the field weighted scoring function:

$$\sum \frac{wtf(k_1+1)}{k_1\left((1-b)+b\frac{wdl}{avwdl}\right)+wtf} \times \log\left(\frac{N}{n}\right) \quad (1)$$

Wherein the terms are defined as follows: wtf is the weighted term frequency or sum of term frequencies of a given terms multiplied by weights across all properties; wdl is the weighted document length; avwdl is the average weighted document length; N is the number of documents on the network; n is the number of documents containing the given query term, summed across all query terms; and $k_1$ and b are constants. These terms and the equation above are described in detail in the Ser. No. 10/804,326 patent application.

As a basic explanation, the weighted term frequency (wtf) corresponds to the term frequency in the document weighted over the different fields in the document. The weighted document length over the average weighted document length provides a measure of how close the current document's length is to the average document length and is a normalization term in the scoring function. The log of the number of documents in the network (N) over the number of documents containing the given query term (n) provides a measure of the document frequency. These quantities are discoverable and retrieved from the content index.

In one embodiment, the scoring function is adjusted to incorporate anchor text by including an additional weighted term frequency value ($wtf_{Anchor}$) that corresponds to the frequency of the term in the anchor text, such that the new scoring function becomes:

$$\sum \frac{(wtf+wtf_{Anchor})(k_1+1)}{k_1\left((1-b)+b\frac{wdl}{avwdl}\right)+(wtf+wtf_{Anchor})} \times \log\left(\frac{N}{n}\right) \quad (2)$$

Accordingly, the term frequency component of the scoring function is updated with the frequency of the term in the anchor text. However, the other terms of the scoring function remain unaffected. The query can obtain the term frequencies for scoring function (2) by simply consulting the main index and the anchor text index separately.

In another embodiment, the document length normalization is adjusted to account for the anchor text by adjusting the scoring function to apply the length normalization to the weighted term frequency of each field of the document before adding the weighted term frequencies together. To incorporate the anchor text into the document length normalization, a new term (B) is defined as:

$$B = \left((1-b)+b\frac{wdl}{avwdl}\right) \quad (3)$$

Equation (1) may then be rearranged according to the new term to produce the following:

$$\sum \frac{\left(\frac{wtf}{B}\right)(k_1+1)}{k_1+\left(\frac{wtf}{B}\right)} \times \log\left(\frac{N}{n}\right) \quad (4)$$

The weighted term frequency associated with the anchor text ($wtf_{Anchor}$) may then bee added into the equation along with a new $B_{Anchor}$ term that corresponds to the length normalization associated with the anchor text such that equation (4) becomes:

$$\sum \frac{\left(\frac{wtf}{B}+\frac{wtf_{Anchor}}{B_{Anchor}}\right)(k_1+1)}{k_1+\left(\frac{wtf}{B}+\frac{wtf_{Anchor}}{B_{Anchor}}\right)} \times \log\left(\frac{N}{n}\right) \quad (5)$$

Accordingly, in one embodiment, $B_{Anchor}$ differs from B by taking the $wdl_{Anchor}$ and $avwdl_{Anchor}$ components of $B_{Anchor}$ from the anchor text field. In another embodiment, the strength of the length normalization is adjusted by also choosing a different $b_{Anchor}$ for the anchor text field. Once the scoring function is adjusted to account for the anchor text, processing moves to block 608.

At block 608, the scoring function is populated with the variables for calculating the score of the current document. As previously stated, the query can obtain the term frequencies for populating the scoring function by simply consulting the main index and the anchor text index separately.

At block 610, the scoring function is executed and the relevance score for the document is calculated. Once the relevance score is calculated, it is stored in memory and associated with that particular document. Processing then moves to decision block 612.

At decision block 612, a determination is made whether relevance scores for all the documents have been calculated according to scoring function (2). The scores may be calculated serially as shown or in parallel. If all the scores have not been calculated, processing returns to block 604 calculating the score for the next document is initiated. However, if the all the scores have been calculated, processing continues to block 614.

At block 614, the search results of the query are ranked according to their associated scores. The scores now take into account the anchor text of each of the documents. Accordingly, the ranking of the documents has been refined so that documents referred to in anchor text reflect that reference. Once the search results are ranked, processing proceeds to block 614, where process 600 returns to block 514 of process 500 in FIG. 5.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for presenting a ranking of search results, comprising:
    providing an index to a plurality of documents including:
        a main index associating with each of the documents a frequency of one or more terms being included in each of the documents;
        an anchor text index associating with each of the documents an anchor text frequency of the one or more terms being included in anchor text in a source document referencing each of the documents;
    receiving a query including at least one query term;
    applying the query to the index to yield results of the query identifying one or more of the documents that include the at least one query term;
    applying a scoring function to generate a score for each of the one or more documents included in the results of the query, wherein the scoring function (score) includes one of:

$$\text{score} = \sum \frac{\left(\frac{wtf}{B} + \frac{wtf_{Anchor}}{B_{Anchor}}\right)(k_1 + 1)}{k_1\left((1-b) + b\frac{wdl}{avwdl}\right) + (wtf + wtf_{Anchor})} \times \log\left(\frac{N}{n}\right); \text{ and}$$

$$\text{score} = \sum \frac{\left(\frac{wtf}{B} + \frac{wtf_{Anchor}}{B_{Anchor}}\right)(k_1 + 1)}{k_1 + \left(\frac{wtf}{B} + \frac{wtf_{Anchor}}{B_{Anchor}}\right)} \times \log\left(\frac{N}{n}\right),$$

where:
        wtf is a weighted term frequency applying a weight to a frequency with which a given query term is included in the document;
        $wtf_{Anchor}$ is a weighted term frequency applying a weight to a frequency with which the given query term is included in anchor text referencing the document;
        $k_1$ is a constant;
        b is a constant;
        wdl is a weighted document length applying a weight to a length of the document being scored;
        avwdl is an average weighted document length of all documents being scored;
        N is the number of documents on the network; and
        n is the number of documents including at least one appearance of a given query term; and
    generating an output of the ranked results of the query to be displayed to a user.

2. The computer-implemented method of claim 1, further comprising building the index by processing each of the plurality of documents to determine the frequency of the one or more terms included in the document.

3. The computer-implemented method of claim 2, further comprising building the index by processing each of the plurality of documents to identify one or more anchor text entries each referencing another document.

4. The computer-implemented method of claim 3, further comprising generating an anchor text table, wherein an entry is made for each of the documents including an anchor text entry, including one or more of:
    a source identifier indicating the document including the anchor text entry;
    a target identifier indicating a target document the anchor text entry references; and
    one or more terms included in content of the anchor text entry.

5. The computer-implemented method of claim 4, further comprising generating the index by collecting for each of the documents:
    the frequency of the one or more terms included in the document; and
    for each of the anchor table entries in which the document is listed as the target document of the target identifier, a frequency of the terms listed in the content of the anchor text entry.

6. The computer-implemented method of claim 1, further comprising ranking the documents according to a scoring function (score) that is determined based on terms including:
    a weighted anchor term frequency ($wtf_{Anchor}$); and
    an anchor text length normalization component ($B_{Anchor}$) derived from:
        a weighted document length (wdl); and
        an average weighted document length (avwdl).

7. The computer-implemented method of claim 1, wherein when the document is not associated with anchor text data, the scoring function (score) includes:

$$\text{score} = \sum \frac{wtf(k_1 + 1)}{k_1\left((1-b) + b\frac{wdl}{avwdl}\right) + wtf} \times \log\left(\frac{N}{n}\right).$$

8. The computer-implemented method of claim 1, wherein a strength of the length normalization provided by $B_{Anchor}$ is adjusted by choosing a different constant value associated with $B_{Anchor}$.

9. A computer-readable storage medium storing instructions executable on a computing system, comprising instructions to:
    evaluate contents of each of a plurality of documents on a network, including:
        recording a frequency of terms included within the document;
        making an entry in an anchor text table for each anchor text entry referencing another document;
    compile an index, including:
        generating a main index that associates with each of the documents a frequency with which the at least one term is included in the document;
        generating an anchor text index that associates with each of the documents a frequency of terms listed in anchor text entries in the anchor text table referencing the document;
    receive a query including at least one query term;
    apply the query to the index to yield results of the query identifying one or more of the documents that include the at least one query term;
    apply applying a scoring function to generate a score for each of the one or more documents included in the results of the query, applying a scoring function to generate a score for each of the one or more documents included in the results of the query, wherein the scoring function (score) includes one of:

$$\text{score} = \sum \frac{\left(\frac{wtf}{B} + \frac{wtf_{Anchor}}{B_{Anchor}}\right)(k_1 + 1)}{k_1\left((1-b) + b\frac{wdl}{avwdl}\right) + (wtf + wtf_{Anchor})} \times \log\left(\frac{N}{n}\right); \text{ and}$$

$$\text{score} = \sum \frac{\left(\frac{wtf}{B} + \frac{wtf_{Anchor}}{B_{Anchor}}\right)(k_1 + 1)}{k_1 + \left(\frac{wtf}{B} + \frac{wtf_{Anchor}}{B_{Anchor}}\right)} \times \log\left(\frac{N}{n}\right),$$

where:
  wtf is a weighted term frequency applying a weight to a frequency with which a given query term is included in the document;
  $\text{wtf}_{Anchor}$ is a weighted term frequency applying a weight to a frequency with which the given query term is included in anchor text referencing the document;
  $k_1$ is a constant;
  b is a constant;
  wdl is a weighted document length applying a weight to a length of the document being scored;
  avwdl is an average weighted document length of all documents being scored;
  N is the number of documents on the network; and
  n is the number of documents including at least one appearance of a given query term; and
generate an output of the ranked results of the query to be displayed to a user.

10. The computer-readable storage medium of claim 9, wherein making the entry in the anchor text table for each of the documents includes:
  storing for a source identifier indicating the document including the anchor text entry;
  storing a target identifier indicating a target document the anchor text entry references; and
  storing one or more terms included in content of the anchor text entry.

11. The computer-readable storage medium of claim 9, wherein when the document is not associated with anchor text data, the scoring function (score) includes:

$$\text{score} = \sum \frac{wtf(k_1 + 1)}{k_1\left((1-b) + b\frac{wdl}{avwdl}\right) + wtf} \times \log\left(\frac{N}{n}\right).$$

12. The computer-readable storage medium of claim 9, wherein a strength of the length normalization provided by $B_{Anchor}$ is adjusted by choosing a different constant value associated with $B_{Anchor}$.

13. The computer-readable storage medium of claim 9, further comprising causing an output of the ranked results of the query to be presented to a user.

14. A search engine system, comprising:
  a processor;
  an index for a plurality of documents, including:
    a main index associating with each of the documents a frequency of one or more terms being included in each of the documents;
    an anchor text index associating with each of the documents an anchor text frequency of the one or more terms being included in anchor text in a source document referencing each of the documents;
  a ranking system, including:
    a query interface configured to receive a query including at least one query term and apply the query to the index to identify one or more of the documents that include the at least one query term;
    a scoring function to generate a score for each of the one or more documents included in the results of the query, wherein the scoring function (score) includes:

$\text{Score} = \Sigma(\text{wtf}/B + \text{wtf}\_{anchor}/B\_{anchor}r)(k1+1)^* \log(N/n) (k1 + (\text{wtf}/B) + (\text{wtf}\_{anchor}r/B\_{anchor}))$ where:
  wtf is a weighted term frequency applying a weight to a frequency with which a given query term is included in the document;
  $\text{wtf}_{Anchor}$ is a weighted term frequency applying a weight to a frequency with which the given query term is included in anchor text referencing the document;
  k1 is a constant;
  wdl is a weighted document length applying a weight to a length of the document being score;
  avwdl is an average weighted document length of all documents being scored;
  B is a document length normalization component defined as B=((1−b)+b*wdl/avwdl) where b is a constant;
  BAnchor is an anchor text normalization component defined as B=((1−b)+b*wdl/avwdl) where b is a constant;
  N is the number of documents on the network; and
  n is the number of documents including at least one appearance of a given query term;
  a ranking system configured to rank the results of the query based on the score generated for each of the documents included in the results of the query.

15. The system of claim 14, further comprising a crawler configured to building the main index by processing each of the plurality of documents to determine the frequency of the one or more terms included in the document.

16. The system of claim 15, wherein the crawler is further configured to build the anchor text index by processing each of the plurality of documents to identify one or more anchor text entries each referencing another document.

17. The system of claim 16, wherein the crawler is further configured to generate an anchor text table, wherein an entry is made for each of the documents including an anchor text entry, including one or more of:
  a source identifier indicating the document including the anchor text entry;
  a target identifier indicating a target document the anchor text entry references; and
  one or more terms included in content of the anchor text entry.

18. The system of claim 17, wherein the crawler is further configured to generate the index by collecting for each of the documents:
  the frequency of the one or more terms included in the document; and
  for each of the anchor table entries in which the document is listed as the target document of the target identifier, a frequency of the terms listed in the content of the anchor text entry.

* * * * *